(12) United States Patent
Sang et al.

(10) Patent No.: US 11,108,220 B2
(45) Date of Patent: Aug. 31, 2021

(54) MULTIFUNCTIONAL SURFACING MATERIAL WITH BURN-THROUGH RESISTANCE

(71) Applicant: CYTEC INDUSTRIES INC., Princeton, NJ (US)

(72) Inventors: Junjie Jeffrey Sang, Newark, DE (US); Fiorenzo Lenzi, Vitulazio (IT); Jonathan Edward Meegan, Chester (GB); Leonard Macadams, Woolwich Township, NJ (US); Yiqiang Zhao, Newark, DE (US); Dalip Kumar Kohli, Churchville, MD (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 391 days.

(21) Appl. No.: 16/067,407

(22) PCT Filed: Dec. 29, 2016

(86) PCT No.: PCT/US2016/069192
§ 371 (c)(1),
(2) Date: Jun. 29, 2018

(87) PCT Pub. No.: WO2017/117383
PCT Pub. Date: Jul. 6, 2017

(65) Prior Publication Data
US 2019/0027913 A1    Jan. 24, 2019

Related U.S. Application Data

(60) Provisional application No. 62/272,902, filed on Dec. 30, 2015.

(51) Int. Cl.
*B32B 27/18* (2006.01)
*H02G 13/00* (2006.01)
(Continued)

(52) U.S. Cl.
CPC ............ *H02G 13/80* (2013.01); *B32B 3/14* (2013.01); *B32B 3/266* (2013.01); *B32B 5/022* (2013.01);
(Continued)

(58) Field of Classification Search
CPC ....... B32B 15/08; B32B 15/092; B32B 15/14; B32B 15/20; B32B 2260/023;
(Continued)

(56) References Cited

U.S. PATENT DOCUMENTS

2013/0149934 A1* 6/2013 Sang ................... B32B 27/12
442/399
2014/0154496 A1   6/2014 Sang et al.

FOREIGN PATENT DOCUMENTS

EP    2339739 A1    6/2011
JP    2007524529 A    8/2007
(Continued)

*Primary Examiner* — Lawrence D Ferguson
(74) *Attorney, Agent, or Firm* — Thi Dang

(57) ABSTRACT

A multifunctional surfacing material capable of providing lightning strike protection (LSP) and burn-through resistance. In one embodiment, the multifunctional surfacing material is composed of a conductive layer positioned between two resin layers, at least one of which contains one or more fire retardant compounds. In another embodiment, the multifunctional surfacing material is composed of a conductive layer positioned between two resin layers one of which is a thermally-stable layer. The surfacing material is co-curable with a composite substrate, e.g. prepreg or prepreg layup, which contains fiber-reinforced matrix resin.

20 Claims, 3 Drawing Sheets

(51) Int. Cl.
- B32B 15/14 (2006.01)
- B64D 45/02 (2006.01)
- B32B 3/14 (2006.01)
- B32B 27/08 (2006.01)
- B32B 5/02 (2006.01)
- B32B 5/26 (2006.01)
- B32B 15/08 (2006.01)
- B32B 3/26 (2006.01)
- B32B 27/28 (2006.01)
- B32B 27/26 (2006.01)
- B32B 27/38 (2006.01)
- B32B 15/092 (2006.01)
- B32B 15/20 (2006.01)
- C08G 59/18 (2006.01)

(52) U.S. Cl.
CPC ............... *B32B 5/024* (2013.01); *B32B 5/26* (2013.01); *B32B 15/08* (2013.01); *B32B 15/092* (2013.01); *B32B 15/14* (2013.01); *B32B 15/20* (2013.01); *B32B 27/08* (2013.01); *B32B 27/18* (2013.01); *B32B 27/26* (2013.01); *B32B 27/283* (2013.01); *B32B 27/38* (2013.01); *B64D 45/02* (2013.01); *C08G 59/18* (2013.01); *H02G 13/00* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2264/0207* (2013.01); *B32B 2264/102* (2013.01); *B32B 2264/105* (2013.01); *B32B 2264/107* (2013.01); *B32B 2264/108* (2013.01); *B32B 2307/202* (2013.01); *B32B 2307/212* (2013.01); *B32B 2307/308* (2013.01); *B32B 2307/3065* (2013.01); *B32B 2307/4026* (2013.01); *B32B 2307/536* (2013.01); *B32B 2307/718* (2013.01); *B32B 2307/732* (2013.01); *B32B 2571/00* (2013.01); *B32B 2605/18* (2013.01)

(58) Field of Classification Search
CPC ...... B32B 2260/046; B32B 2262/0269; B32B 2262/101; B32B 2262/106; B32B 2264/0207; B32B 2264/102; B32B 2264/105; B32B 2264/107; B32B 2264/108; B32B 2307/202; B32B 2307/212; B32B 2307/3065; B32B 2307/308; B32B 2307/4026; B32B 2307/536; B32B 2307/718; B32B 2307/732; B32B 2571/00; B32B 2605/18; B32B 27/08; B32B 27/18; B32B 27/26; B32B 27/283; B32B 27/38; B32B 3/14; B32B 3/266; B32B 5/022; B32B 5/024; B32B 5/26; B64D 45/02; C08G 59/18; H02G 13/00; H02G 13/80
See application file for complete search history.

(56) References Cited

FOREIGN PATENT DOCUMENTS

| | | |
|---|---|---|
| JP | 2008506803 A | 3/2008 |
| WO | 2005032812 A2 | 4/2005 |
| WO | 2006005716 A2 | 1/2006 |
| WO | 2006057498 A1 | 6/2006 |
| WO | 2009128991 A1 | 10/2009 |
| WO | 2014088866 A1 | 6/2014 |
| WO | 2014125044 A1 | 8/2014 |

* cited by examiner

MULTIFUNCTIONAL SURFACING MATERIAL WITH BURN-THROUGH RESISTANCE

CROSS-REFERENCE TO RELATED APPLICATIONS

The present application is a U.S. national phase entry under 35 U.S.C. § 371 of International Application No. PCT/US2016/069192, filed on 29 Dec. 2016, which claims priority to U.S. provisional Application No. 62/272,902, filed on 30 Dec. 2015, the entire content of each of these applications is explicitly incorporated herein by reference.

The present disclosure is pertaining to a multifunctional surfacing material, the method of making and applications thereof.

DETAILED DESCRIPTION

Figure 1:
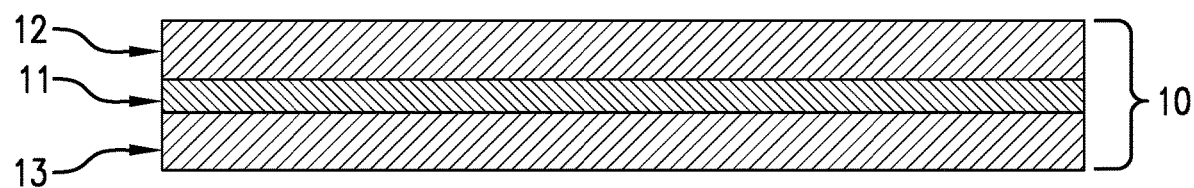
FIG. 1 schematically illustrates an integrated conductive surfacing material according to one embodiment.

In recent years, resin-impregnated, fiber-reinforced composite materials have been used for making aerospace structural parts such as aircraft wings and fuselage. The composite materials used in the fabrication of aerospace component parts must have certain characteristics to protect the parts from damage or hazards caused by common environmental occurrences, in particular, lightning strikes. Lightning strikes can severely damage and/or punch through component parts if such parts are not adequately conductive and grounded throughout the aircraft. Thus, it is desirable that such component parts are manufactured to have characteristics which, among other characteristics, prevent or alleviate damage caused by lightning strikes.

Moreover, all non-metallic materials used inside the pressure vessel of commercial aircrafts are subject to flammability regulations in many countries. The heat, smoke and gases released by a burning composite and the degradation in structural integrity can quickly jeopardize the safety of an aircraft.

Some materials such as thermal insulators, if applied as outer layers over aircraft's composite structures, could potentially provide protection against a fire scenario. As an example, thermal insulating layers may delay the temperature rise and subsequent destruction of the underlying composite structures. Such insulating layers may contain a thermoset resin and thermal insulating fibers (e.g. glass or mineral wool). However, layers that are suitable for this purpose are associated with significant increase in weight. This in turn increases the aircraft's weight and may negatively affect the fuel economy and maintainability of the aircraft as well as other performances. As an example, an arrangement involving thick thermal insulating layers is not recommended since this negatively affects the electrical and lightning strike performance of the composite structures.

It is highly desirable that composite materials used in aircraft structures such as fuselage structures can provide improved burn-through protection comparing to state-of-art composite materials. It is also highly desirable to have a multifunctional protective top surfacing layer on a composite structure that can simultaneously provide fire barrier, lightning strike protection and good surface properties for subsequent painting along with weight saving.

Disclosed herein is a multifunctional surfacing material that is light-weight and can simultaneously provide burn-through resistance, lightning strike protection and good surface properties such as smoothness and paint-stripper resistance. The multifunctional surfacing material disclosed herein is suitable for incorporation into the primary and secondary structures of aircrafts as a surfacing layer at the top of or near the top of a composite structure.

In some embodiments, the multifunctional surfacing material is used as an outer layer of an aircraft composite structure (for example, the fuselage skin) to satisfy the multifunctional requirements in terms of fuselage burn-through protection and lightning strike protection.

In some embodiments, the main advantages of the resulting fuselage construction, as compared to state-of-the art solutions, are:

Complete and continuous coverage of the fuselage skin with no discontinuities.

No requirement for complex internal fire protection barriers.

Weight saving since no burn-through resistant insulation materials are mandatory inside the fuselage wall.

Integrated lightning strike protection and electromagnetic shielding capabilities.

FIG. 1 schematically illustrates a conductive surfacing material 10 according to one embodiment. Referring to FIG. 1, the conductive surfacing material 10 includes a continuous, nonporous metal layer 11 sandwiched between two curable resin layers 12 and 13 which are formulated to provide fire-retardant characteristics and/or thermal stability after curing. The curable layers are void of any reinforcement fibers such as carbon fibers.

In one embodiment, both curable resin layers are formed from an epoxy-based composition containing a fire retardant component. In an alternative embodiment, the two curable layers are formed from two different resin compositions, one of which results in a high-temperature resistant and thermally stable polymer layer upon curing. In one embodiment, the thermally stable polymer layer is a silicone layer. It is believed that the combination of the curable layers and the metal layer can provide a synergistic effect which results in an improvement in burn-through resistance.

Figure 2:
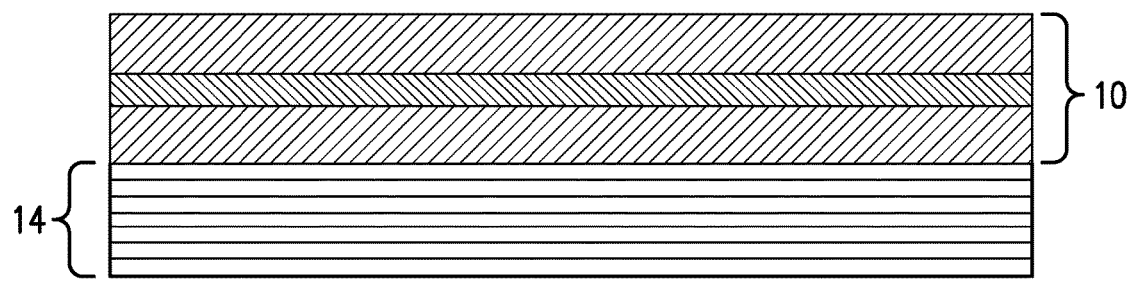
FIG. 2 schematically illustrates the integrated conductive surfacing material shown in FIG. 1 being placed on a composite substrate.

The conductive surfacing material 10 may be a separate structure that is fabricated prior to being placed onto a composite substrate. FIG. 2 shows the surfacing material 10 being placed on a composite substrate 14 with the (inner) resin layer 13 in direct contact with the composite substrate 14, and the resin layer 12 as the outer resin layer with an exposed surface.

One aspect of the present disclosure is pertaining to a composite panel having the conductive surfacing material 10 as the top layer, which top layer is able to provide a burn-through protection time of at least 5 minutes for the penetration of an external fuel fire into an aircraft cabin after crash, so that no additional burn-through resistant insulation materials are required in the aircraft fuselage, and at the same time, such top layer can also provide lightning strike protection of the fuselage without any additional protection material.

The conductive surfacing material may be in the form of a flexible tape (referred to as "surfacing tape"), which is lightweight and is configured for an automated placement process such as Automated Tape Laying (ATL) or Automated Fiber Placement (AFP). Due to its flexibility and lightweight property, the surfacing tape can be laid down at a significantly faster rate as compared to conventional resin-impregnated prepreg tapes. The surfacing tape may have a width of about 0.125 in to about 12 in (or about 3.17 mm to about 305 mm). In one embodiment, the surfacing tape has a width of about 0.125 in to about 1.5 in (or about 3.17 mm to about 38.1 mm), including about 0.25 in to about 0.50 in (or about 6.35 mm to about 12.77 mm). In another embodiment, the surfacing tape has a width of about 6 in to about 12 in (or about 152 mm to about 305 mm). The length of the tape is continuous or is very long relative to its width, for example, 100-100,000 times its width. In continuous form, the surfacing tape can be wound up into a roll for storage before its application in an automated placement process.

The metal layer 11 in FIG. 1 may be a solid metallic foil having a melting temperature above 900° C., particularly, in the range of about 900° C. to about 2000° C. Metals suitable for the intended purpose herein include, but are not limited to, Chromium, Copper, Gold, Iron, Manganese, Nickel, Stainless Steel, Titanium, Tungsten, Brass, Bronze, Silver, and alloys thereof. Inconel (austenitic nickel-chromium super alloy) is also suitable. Preferable are metal foils have a melting temperature above 1000° C., particularly, in the range of about 1000° C. to about 2000° C. Metal foils with high melting point and high electrical conductivity are mostly preferred, particularly, Copper, Titanium, Bronze, Nickel, and the like. The metal foil surface may be chemically treated to improve the chemical bonding between the foil and the adjacent resin layers. The solid metallic foil may have a thickness within the range of about 5 μm to about 125 μm, in some embodiments, within the range of about 10 μm to about 38 μm.

The compositions of the curable resin layers (12, 13) in the conductive surfacing material are described in more details below.

Resin Layers with Fire-Retardant

In one embodiment, the first (outer) curable resin layer 12 in FIG. 1 is a low weight epoxy-based resin layer having one or more fire retardant compounds incorporated therein. The epoxy-based resin layer is formed from a curable resin composition that includes at least one epoxy resin, a curing agent, and at least one fire retardant compound. The second (inner) curable resin layer 13 is similar in composition relative to the first curable resin layer 12. Each resin layer may have an areal weight of about 100 gsm to about 200 gsm (g/m$^2$).

The terms "cure" and "curing" as used herein refer to the irreversible hardening of a pre-polymer material, monomers or a resin precursor brought about by heating at elevated temperatures, exposure to ultraviolet light and radiation, or chemical additives. The term "curable" means possible to be cured into a hardened material.

The curable resin composition for the resin layers may further include one or more of: a polymeric toughening component to toughen the cured resin matrix, ceramic microspheres as a fluid barrier component, and particulate inorganic fillers as a rheology modifying component.

In some embodiments, the resin composition includes a mixture of multifunctional epoxy resins, a latent amine curing agent, a fire-retardant component, a polymeric toughening component, ceramic microspheres, and particulate inorganic fillers. The multifunctional epoxy resins and the ceramic microspheres make up more than 35% by weight of the total composition, preferably more than 45% by weight.

In some embodiments, both of the first and second resin layers (12,13) are formed from the same resin composition. In other embodiments, the first and second resin layers (12,13) are different in composition with regard to the specific thermoset resins, curing agents, fire-retardants, tougheners, and other additives disclosed herein, but both resin layers are formulated so as to have fire-retardant characteristics after curing.

With varying resin compositions, the outer resin layer can be formulated to provide the desired low flammability, low smoke density, low toxicity, good composite surfacing performance, environmental durability, Ultraviolet (UV) stability, and micro-crack resistance.

Fire-Retardant Component

The fire-retardant component in the curable resin layer includes one or more compounds which can provide fire retardation to the cured resin layer as determined by a burn-through test. Suitable fire retardant compounds include:

(a) organic phosphorous-containing compounds such as trimethyl phosphate, triethyl phosphate, tributyl phosphate, trioctyl phosphate, tributoxyethyl phosphate, tricresyl phosphate, cresyldiphenyl phosphate, octyldiphenyl phosphate, polyphosphonate, polyphosphate, including aromatic polyphosphate;

(b) inorganic phosphorous-containing compounds such as elemental red phosphorous, melamine phosphate, melamine polyphosphate, ammonium polyphosphate, dimelamine phosphate, pyrophosphate, and inorganic phosphinates such as aluminum phosphinate;

(c) Melamine Cyanurate;

(d) polyphosphazenes;

(e) phosphorous-modified epoxy or phenolic resin (f) boron-containing compounds such as zinc borate, barium metaborate, calcium metaborate;

and mixtures thereof.

The phosphorous-modified epoxy or phenolic resin is an epoxy or a phenolic resin having chemically-bonded phosphorus atoms. This modified resin can be obtained by reacting a multifunctional epoxy or phenolic resin (e.g. bisphenol A diglycidyl ether, phenolic polyglycidyl ether, cresol novolac resin) with an organic phosphinic acid (e.g. methanephosphonous acid and diethylphosphinic acid) or anhydride thereof. A specific example is a derivative of DOPO (or 9,10-Dihydro-9-oxa-10-phosphaphenanthrene 10-oxide) which is prepared by reacting a multifunctional epoxy with DOPO. The phosphorus-modified epoxy resins remain reactive prior to curing and can be cured using conventional curing agents. The phosphorus content in the phosphorous-modified epoxy resin may be within the range of about 3% to about 11% by weight.

The phosphorous modified epoxy resins or phenolic resins may be liquid or solid at room temperature (20° C.-25° C.) and may have an epoxy equivalent weight (g/eq) of from about 170 to about 450 as determined by ASTM D-1652. Examples of commercially available, flame retardant, phosphorous-modified epoxy resins include SEN 6070, 6075, 6085, 6095, SEN-275MC 75, SEN-290MC 65, XEN-0140, XEN-0230 from Shin-A T&C Co.; HFC-350, HPC 9080-60P, and EXB-X available from DIC Corp. The phosphorus content in those resins is within the range of 3%-11% by weight.

In a preferred embodiment, one or more of the listed fire-retardant compounds (a)-(f) is/are combined with a smoke-suppressant, which may be selected from metal hydroxides such as magnesium hydroxide, and alumina trihydrate.

Examples of desirable fire-retardant combinations include:

1) one or more organic and inorganic phosphorous-containing compounds (a)+(b)+Melamine Cyanurate (c)+a boron-containing compound (g)+a metal hydroxide;

2) one or more inorganic phosphorous-containing compounds (b)+polyphosphazenes (d)+a boron-containing compound (g)+a metal hydroxide;

3) one or more organic and inorganic phosphorous-containing compounds (a)+(b))+Melamine Cyanurate (c)+a phosphorous-modified epoxy or phenolic resin (e)+a boron-containing compound (g)+a metal hydroxide.

4) one or more organic and inorganic phosphorous-containing compounds (a)+(b)+Melamine Cyanurate (c)+a boron-containing compound (g)+a metal hydroxide.

The total amount of fire-retardant(s) and any smoke suppressant (together referred to as "fire-retardant component") may be within the range from about 2% to about 60% by weight based on the total weight of the composition, in some embodiments, from about 40% to about 60%.

Epoxy Resins

Suitable epoxy resins for the curable resin compositions disclosed herein are multifunctional epoxy resins (or polyepoxides), i.e., epoxy resins containing two or more epoxy functional groups per molecule.

Examples of multifunctional epoxy resins include the polyglycidyl ethers, which are prepared by reaction of epichlorohydrin or epibromohydrin with a polyphenol in the presence of alkali. Suitable polyphenols are, for example, resorcinol, pyrocatechol, hydroquinone, bisphenol A (bis(4-hydroxyphenyl)-2,2-propane), bisphenol F (bis(4-hydroxyphenyl) methane), bis(4-hydroxyphenyl)-1,1-isobutane, 4,4'-dihydroxybenzophenone, bis(4-hydroxyphenyl)-1,1-ethane, and 1,5-hydroxynaphthalene.

Also included are the polyglycidyl ethers of polyalcohols. Such polyalcohols include ethylene glycol, diethylene glycol, triethylene glycol, 1,2-propylene glycol, 1,4-butylene glycol, triethylene glycol, 1,5-pentanediol, 1,6-hexanediol, and trimethylolpropane.

Additional epoxy resins include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxides may include those derived from the epoxidation products of olefinically-unsaturated cycloaliphatic compounds or from natural oils and fats.

Also included are liquid epoxy resins which are liquid reaction products of bisphenol A or bisphenol F and epichlorohydrin. These epoxy resins are liquid at room temperature (20° C.-25° C.) and generally have epoxy equivalent weight (g/eq) of from about 150 to about 480 as determined by ASTM D-1652. Commercially available liquid epoxy resins include D.E.R.™ 331 from Dow Chemical Co.

Particularly suitable are epoxy novolac resins which are polyglycidyl derivatives of phenol-formaldehyde novolacs or cresol-formaldehyde novolacs having the following chemical structure:

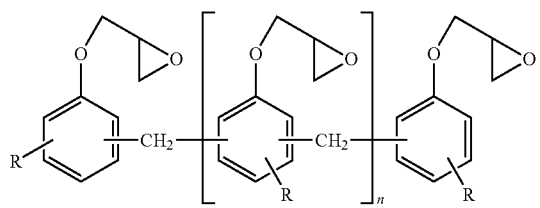

wherein n=0 to 5, and R═H or CH$_3$. When R═H, the resin is a phenol novolac resin. When R═CH$_3$, the resin is a cresol novolac resin. The former is commercially available as DEN 428, DEN 431, DEN 438, DEN 439, and DEN 485 from Dow Chemical Co. The latter is commercially available as ECN 1235, ECN 1273, and ECN 1299 from Ciba-Geigy Corp. Other suitable novolacs that may be used include SU-8 from Celanese Polymer Specialty Co. In some embodiments, the epoxy novolac resin has a viscosity of about 4000 to about 10,000 mPa·s at 25° C. and an epoxide equivalent weight (EEW) of about 190 g/eq to about 235 g/eq as determined by ASTM D-1652.

A particularly suitable multifunctional epoxy resin is a tetra-functional aromatic epoxy resin having four epoxy functional groups per molecule and at least one glycidyl amine group. An example is tetraglycidyl ether of methylene dianiline having the following general chemical structure:

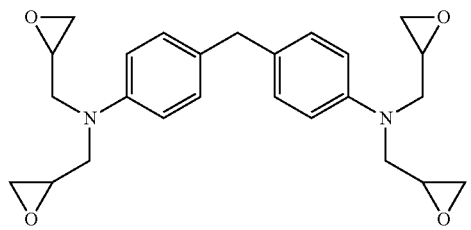 [SMILES: c1cc(N(CC2CO2)CC2CO2)ccc1Cc1ccc(N(CC2CO2)CC2CO2)cc1]

The amine groups in structure are shown in the para- or 4,4' positions of the aromatic ring structures, however, it should be understood that other isomers, such as 2,1', 2,3', 2,4', 3,3', 3,4', are possible alternatives. Examples of commercially available tetra-functional epoxy resins are Araldite® MY 9663, MY 9634, MY 9655, MY-721, MY-720, MY-725 supplied by Huntsman Advanced Materials.

Another particularly suitable multifunctional epoxy resin is a tri-functional epoxy resin, for example, triglycidyl ether of aminophenol. Specific examples of commercially available tri-functional epoxy resins are Araldite® MY 0510, MY 0500, MY 0600, MY 0610 supplied by Huntsman Advanced Materials.

The curable resin composition may be formulated so as to yield high glass transition temperature (Tg) and high cross-linked density. In some embodiments, a combination of epoxy novolac resin(s) and non-novolac multifunctional epoxy resin(s) such as tri-functional and tetra-functional epoxy resins is used. The relative amounts of epoxy novolac resin and non-novolac multifunctional epoxy resin may be varied but it is preferred that the amount of epoxy novolac resin is within the range of about 80 to about 100 parts per 100 parts of non-novolac multifunctional epoxy resin. The combination of epoxy novolac resin and multifunctional epoxy resin at the specified proportion contributes to the desired high Tg and high cross-linked density upon curing.

The total amount of all resins in the curable resin composition makes up at least 15% by weight based on the total weight of the resin composition. For example, the total amount of resins may constitute from about 30% to about 60% by weight, or from about 15% to about 25% by weight, based on the total weight of the resin composition.

Toughening Component

The toughening component may include a toughening material selected from: thermoplastic polymers, elastomers, core-shell rubber particles, a pre-react adduct which is a reaction product of an epoxy resin, a bisphenol, and an elastomeric polymer, and combinations thereof. In some embodiments, a combination of two different toughening materials from this group is used. The amount of toughening material(s), in total, may be from about 0.5% to about 30%, in some cases, from about 5% to about 20%, by weight based on the total weight of the composition.

With regard to the pre-react adduct, suitable epoxy resins for forming the adduct include diglycidylether of Bisphenol A, diglycidylether of tetrabromo Bisphenol A, hydrogenated diglycidyl ether of bisphenol A, or hydrogenated diglycidyl ether of bisphenol F. Also suitable are cycloaliphatic epoxies, which include compounds that contain at least one cycloaliphatic group and at least two oxirane rings per molecule. Specific examples include diepoxide of cycloaliphatic alcohol, hydrogenated Bisphenol A represented by the following structure:

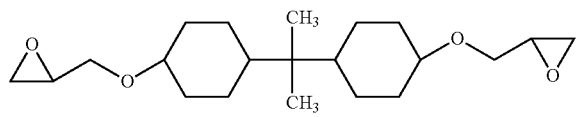 [SMILES: CC(C)(C1CCC(OCC2CO2)CC1)C1CCC(OCC2CO2)CC1]

An example of such cycloaliphatic epoxy resin is EPALLOY® 5000 (a cycloaliphatic epoxy prepared by hydrogenating bisphenol A diglycidyl ether) available from CVC Thermoset Specialties. Other cycloaliphatic epoxides suitable for use in the pre-react adduct may include EPONEX cycloaliphatic epoxy resins, e.g. EPONEX Resin 1510 supplied by Momentive Specialty Chemicals.

The bisphenol in the pre-react adduct functions as a chain extension agent for the linear or cycloaliphatic epoxy. Suitable bisphenols include bisphenol A, tetrabromo bisphenol A (TBBA), Bisphenol Z, and tetramethyl Bisphenol A (TMBP-A).

Suitable elastomers for forming the pre-react adduct include, but are not limited to, liquid elastomers such as amine-terminated butadiene acrylonitrile (ATBN), carboxyl-terminated butadiene acrylonitrile (CTBN), and carboxyl-terminated butadiene (CTB). Also possible are fluorocarbon elastomers, silicone elastomers, styrene-butadiene polymers. In an embodiment, the elastomer used in the pre-react adduct is ATNB, CTBN or CTB.

In one embodiment of the pre-react adduct, the epoxy resin is reacted with the bisphenol chain extension agent and the elastomer polymer in the presence of a catalyst, such as triphenyl phosphine (TPP), at about 300° F. (or 148.9° C.) to chain link the epoxy resins and to form a high viscosity, film-forming, high molecular-weight epoxy pre-react adduct. The pre-react adduct is then mixed with the remaining components of the resin composition.

Suitable thermoplastic tougheners include polyarylsulfone polymers such as polyether sulfone (PES), polyether ether sulfone (PEES). In some embodiments, the toughening agent is a copolymer of PES and PEES, which is described in U.S. Pat. No. 7,084,213. In some embodiments, the toughener is poly(oxy-1,4-phenylenesulfonyl-1,4-phenylene), which has a $T_g$ of about 200° C. as measured by Differential Scanning calorimetry (DSC).

The toughening component may include core-shell rubber (CSR) particles having particle size of 300 nm or less as determined by laser diffraction. The CSR particles may be any of the core-shell particles where a soft core is surrounded by a hard shell. Suitable CSR particles are those having a polybutadiene rubber core or butadiene-acrylonitrile rubber core and a polyacrylate shell. CSR particles having a hard core surrounded by a soft shell may also be used, however. The CSR particles may be supplied as a 25%-40% in weight percentage of CSR particles dispersed in a liquid epoxy resin. CSR particles having rubber cores and polyacrylate shells are available commercially from Kaneka Texas Corporation (Houston, Tex.) under the tradename Kane Ace MX. It is preferred, but not required, that the core-shell rubber particles be added to the resin composition as a suspension of particles in a suitable liquid epoxy resin. Kane Ace MX 411 is a suspension of 25% by weight core-shell rubber particles in MY 721 epoxy resin and is a suitable source of core-shell rubber particles. Kane Ace MX 120, MX 125, or MX 156, which contains 25%-37% by weight of the same core-shell rubber particles dispersed in DER 331 resin, is also a suitable source of core-shell rubber particles. Other sources of core-shell rubber particles, such as MX 257, MX 215, MX217 and MX 451, may also be used. Another commercial source of core-shell rubber particles is Paraloid™ EXL-2691 from Dow Chemical Co. (methacrylate-butadiene-styrene CSR particles with average particle size of about 200 nm).

Curing Agents

The epoxy resins in the resin compositions disclosed herein may be cured by a variety of latent amine curing agents, which are activated at elevated temperatures (e.g. temperature in the range of about 150° F. (65° C.) to about 392° F. (200° C.). The amine curing agents include aliphatic polyamines, polyamides, amidoamines, and cycloaliphatic amines. Specific examples of amine curing agents include dicyandiamide (DICY), 4, 4'-diaminodiphenylsulfone (4,4'DDS), 3,3'-diaminodiphenylsulfone (3,3'DDS), guanamine, guanidine, aminoguanidine, and derivatives thereof. Compounds in the class of imidazole and amine complexes may also be used. In an embodiment, the curing agent is dicyandiamide (DICY). The amine curing agent may be present in an amount within the range of about 0.5% to about 30% by weight based on the total weight of the resin composition. In most cases, the amount amine curing agent is selected so that of the reactant amine groups are in a 1:1 stoichiometric ratio with the reactant epoxy groups in the resin composition.

A curing accelerator may be added in conjunction with the amine curing agent to promote the curing reaction between the epoxy resins and the amine curing agent. Suitable curing accelerators may include alkyl and aryl substituted ureas (including aromatic or alicyclic dimethyl urea), and bisureas based on toluenediamine or methylene dianiline. One example of bisurea is 4,4'-methylene bis(phenyl dimethyl urea), commercially available as Omicure U-52 or CA 152 from CVC Chemicals, which is a suitable accelerator for dicyandiamide. Another example is 2,4-toluene bis(dimethyl urea), commercially available as Omicure U-24 or CA 150 from CVC Chemicals. The curing accelerator may be present in an amount within the range of about 0.5% to about 3% by weight based on the total weight of the resin composition.

Ceramic Microspheres

Ceramic microspheres are added to the resin composition to improve the surface smoothness of the resin film formed therefrom. In one embodiment, hollow, ceramic microspheres made of an inert silica-alumina ceramic material are used. The ceramic microspheres may have a crush strength of over 60,000 psi, a dielectric constant of about 3.7-4.6, a softening point in the range of 1000-1100° C. (or 1832-2012° F.), and particle diameters ranging from 0.1 micron to 50 microns, or 1-50 microns. The high softening point of the ceramic microspheres enables them to be nonabsorbent to solvents, non-flammable, and highly resistant to chemicals. Microspheres having diameters ranging from about 0.1 μm to about 20 μm, or from about 1 μm to about 15 μm, have been found to be particularly suitable. An example of commercially available ceramic microspheres which are particularly suitable for use in the resin compositions disclosed herein are sold by Zeelan Industries, Inc. under the trade name Zeeospheres®, for example, G-200, G210 and W-200. These are hollow, silica-alumina spheres with thick walls, odorless, and light gray in color. In one embodiment, the combination of the multifunctional resins and ceramic microspheres makes up more than 50% by weight, preferably more than 60% by weight, of the resin composition. The amount of ceramic microspheres is at least 3% by weight, based on the total weight of the resin composition. For example, the amount of ceramic microspheres, in weight percentages, may be within the range of about 5% to about 15%, or about 10% to about 30%, or about 20% to about 40%, by weight based on the total weight of the resin composition.

Flow Control Agents

Inorganic fillers in particulate form (e.g. powder) may be added to the resin composition as a rheology modifying component to control the flow of the resinous composition and to prevent agglomeration of components therein. Suitable inorganic fillers that may be used in the resin composition include talc, mica, calcium carbonate, alumina, and fumed silica. In one embodiment, hydrophobic fumed silica (e.g. Cab-O-Sil TS-720) is used as the inorganic filler. The amount of inorganic fillers may be within the range from about 0.5% to about 5% by weight based on the total weight of the resin composition.

Optional Additives

The resin composition may further include one or more optional additives which affect one or more of mechanical, electrical, optical, and/or thermal properties of the cured or uncured resin composition. Such additives include, but are not limited to, ultraviolet (UV) stabilizers, pigments/dyes, and conductive materials.

Examples of UV stabilizers or absorbers that may be added to the resin composition include butylated hydroxytoluene (BHT); 2-hydroxy-4-methoxy-benzophenone (e.g. UV-9); 2,4-bis(2,4-dimethylphenyl)-6-(2-hydroxy-4-octyloxyphenyl)-1,3,5-triazine (e.g. CYASORB® UV-1164 light absorber); 3,5-di-tert-butyl-4-hydroxybenzoic acid; n-hexadecyl ester (e.g. CYASORB® UV-2908 light stabilizer); Pentaerythritol Tetrakis(3-(3,5-di-tert-butyl-4-hydroxyphenyl)propionate (e.g. IRGANOX 1010). Liquid hindered-amine light stabilizer from Ciba Specialty Chemicals, such as 2-(2H-benzotriazol-2-yl)-4,6-ditertpentylphenol (e.g. TINUVIN 328), Methyl 1,2,2,6,6-pentamethyl-4-piperidyl sebacate (e.g. TINUVIN 292). Decanedioic acid, bis(2,2,6,6-tetramethyl-1-(octyloxy)-4-piperidinyl ester (e.g. TINUVIN 123), may also be used as suitable UV stabilizers. In addition, nano-sized zinc oxide (n-ZnO), e.g. NanoSun-Guard 3015, and titanium oxide nanoparticles (n-TiO2) may also be used as UV stabilizers. When UV stabilizers additives are used, their total amount is 5% or less by weight based on the total weight of the resin composition.

Pigments and/or dyes known in the art for adding color to resinous systems may be added to the resin composition. Examples of pigments and/or dyes include, but are not limited to, red iron oxide, green chromium, carbon black, and titanium oxide. In an embodiment, titanium oxide (white) pigment is added to the resin composition. In another embodiment, carbon black pigment is added.

Conductive materials in particulate form, e.g. particles or flakes, may also be added to the resin composition to enhance electrical conductivity. Examples of suitable conductive materials include metals such as silver, gold, nickel, copper, aluminum, bronze, and alloys thereof, in the form of flakes or particles. Carbon-based materials, such as carbon nano-tubes (single-wall nano tubes or multi-wall nano tubes), carbon nano-fibers, and graphene may also be used as conductive additives to impart the electrical conductivity to the resin layers. The nano-fibers may have diameters ranging from 70 to 200 nanometers and a length of about 50-200 microns. The nano-tubes may have an outer diameter of about 10 nanometers, length of about 10,000 nanometers, and an aspect ratio (L/D) of about 1000. In addition, conductive additives may also include carbon black particles (such as Printex XE2 from DeGussa).

Thermally Stable Resin Layer

In an alternative embodiment, the surfacing material is composed of a conductive layer positioned between two curable resin layers, one of which is a thermally stable layer. With reference to FIGS. 1 and 2, the inner curable layer 13 (which is in contact with the composite substrate or prepreg layup) may be the layer that will provide high-temperature resistance and thermal stability. The composition of the thermally stable resin layer contains a resin or polymer having a low weight loss of less than 50% by weight (w/w), preferably, less than 25% by weight (w/w), when the resin or polymer is heated to a temperature in the range of about 600° to about 800° C. at a ramp rate from about 5° C./min to 10° C./min. The weight loss is determined by Thermogravimetry Thermal Analysis (TGA) testing according to ASTM E1131 and ISO 11358. The outer curable resin layer 12 may be an epoxy-based resin layer containing one or more fire retardant compounds as described previously.

In one embodiment, the thermally stable resin layer is formed from a silicone-based composition containing a blend of silicone polymers, and optionally, a cross-linking catalyst. The blend of silicone polymers may include one or more polydiorganosiloxane homopolymers of the general formula (I) and one or more silicone copolymers of the general formula (II):

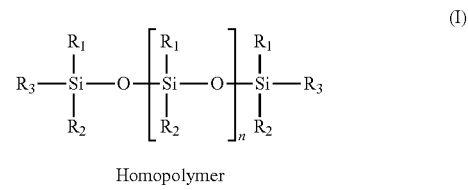

Homopolymer

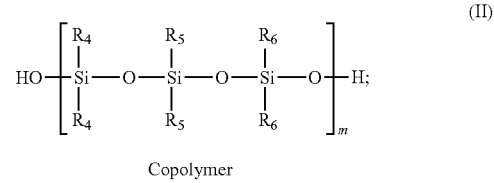

Copolymer wherein, for formula (I), $R_1$ and $R_2$ are the same or different and are independently selected from hydrogen, alkyl group having from 1 to 6 carbon atoms, such as methyl, ethyl and the like, phenyl group, vinyl group, and a halogenated alkyl, phenyl, or vinyl group as above, such as 3,3,3-trifluoropropyl; $R_3$ can be the same as $R_1$ and $R_2$ or can be an hydroxy group; and, n is an integer of from 0 to 10,000;

for formula (II), at least one of $R_4$, $R_5$ and $R_6$ are different and are independently selected from hydrogen, alkyl group, alkyl phenyl group and vinyl group, where "alkyl" is as described above for formula (I); and m is an integer of from 1 to 10,000.

Particularly suitable silicone homopolymers are polydiorganosiloxanes such as silsesquioxane polymer, polydimethylsiloxane (or PDMS), polydiphenylsiloxane, polydiethylsiloxane, and silanol-terminated polydimethyl siloxane.

An example of a suitable copolymer is phenylsilsesquioxane-dimethylsiloxane copolymer with 70% Phenyl, 30% Dimethyl. Also suitable are silicone block copolymers having silicone blocks of different compositions. For example, a useful silicone block copolymer can be formed by reaction of linear polydimethylsiloxanes having silanol end groups with p-bis(dimethylhydroxysilyl)benzene. Other silicon-organic copolymers such as silicone-polyether block copolymers may also be used.

Fillers in particulate form may be added to the silicone polymer blend as a heat resistant filler material. Suitable fillers include silica, quartz, alumina, inorganic oxides, aluminosilicates such as mullite, inorganic carbides, inorganic nitrides, and mixtures thereof.

The silicone polymers form a rigid cross-linked thermoset network under certain thermal curing conditions. For example, the curing temperature for silicone-based resin layer may be from about 175° C. to about 300° C. An effective amount of a catalyst to initiate the crosslinking may be used. Suitable catalysts include peroxide (when silicone polymers contain vinyl groups), silica acid ester, such as tetraethylsilicate, an organo-zinc compound, such as zinc hexanoic acid or zinc octoate. An example of an effective amount of the crosslinking catalyst is from about 0.05% to about 5% by weight, or about 0.1% to about 3% by weight, based upon the total weight of the silicone-based composition (polymer blend and filler if present).

Applications

The multifunctional surfacing material disclosed herein can be applied on a composite substrate by hand layup or an automated placement process, such as AFP and ATL, to form a composite structure with lightning strike protection capability and burn-through resistance. The surfacing material can also provide high electromagnetic interference (EMI) shielding (greater than 60 dB) within wide frequency range (8-18 GHz). Furthermore, the multifunctional surfacing material can provide significant weight savings comparing to state-of-the art solutions.

A fuselage of an aircraft having the multifunctional surfacing material as outer layer may provide significant protection against the propagation of flame into the cabin. Since the actual fuselage is protected against burn-through, components used for this purpose inside the cabin may not be required. Moreover, interior panels are insulated from a fire occurring outside the cabin, thus preventing them from falling on the passengers. Such prevention is critical specially because collapsing of interior panels may impede or delay the passengers evacuation in case of an emergency landing.

A manufacturing method for the composite panel disclosed herein includes co-curing the multifunctional surfacing material disclosed herein with the structural composite material to yield a final composite structure. It has been found that the addition of such multifunctional surfacing material results in improved burn-through and lightning strike resistance as compared to a structural composite material having no protective layer.

The improvement of burn-through resistance may be evaluated by measuring the time for fire penetration and the back side temperatures of a composite panel during a burn-through test executed at 182 KW/m$^2$. A test for burn-through resistance is that the composite panel prevents fire penetration when exposed to a flame at 1100° C.-1200° C. for at least 5 minutes. Additionally, the heat flow measured at a point 12 inches from the cold side of the composite panel should not exceed 22.7 KW/m$^2$.

The improvement of lightning strike resistance may be evaluated by measuring the damage occurring after simulated lightning strike (LS) on the composite panels, applying lightning waveforms which are defined in ED-84 as having components A+B+C* or D+B+C*. Damage area can be evaluated by ultrasonic scanning.

The multifunctional surfacing material disclosed herein can be applied onto and co-cured with a fiber-reinforced, polymeric composite substrate. Co-curing may be carried out at elevated temperature up to 200° C., for example, within the range of 93° C. to 190° C. (or 200° F. to 374° F.), or within the range of 170° C.-190° C. (or 338° F.-374° F.), and with use of elevated pressure to restrain deforming effects of escaping gases, or to restrain void formation, suitably at pressure of up to 10 bar (1 MPa), preferably in the range of 3 bar (0.3 MPa) to 7 bar (0.7 MPa). In some embodiments, the cure temperature is attained by heating at up to 5° C./min, for example, 2° C./min to 3° C./min, and is maintained for the required period of up to 9 hr, or up to 6 hr, for example, between 2 hr and 4 hr. The use of a catalyst in the matrix resin may allow even lower cure temperatures. Pressure is released throughout, and temperature is reduced by cooling at up to 5° C./min, for example, up to 3° C./min.

The fiber-reinforced, polymeric composite substrate is composed of reinforcement fibers which have been impregnated or infused with a curable matrix resin. In some embodiments, the composite substrate is a prepreg ply or a prepreg layup. The prepreg layup is composed of a plurality of prepreg plies arranged in a stacking sequence. Each prepreg ply is composed of reinforcement fibers, in the form of a fabric or directionally aligned, continuous fibers, that have been impregnated/infused with a matrix resin, e.g. epoxy resin. The directionally aligned fibers may be unidirectional or multi-directional fibers. In general, the curable surfacing material disclosed herein may be applied onto a fiber-reinforced, polymeric composite substrate, which is in an uncured or partially cured state, followed by co-curing to form a fully-cured composite structure having a hardened surfacing film bonded thereto as the outermost layer.

The reinforcement fibers of the composite substrate, e.g. prepreg ply, for the purposes herein include fibers with a high tensile strength, for example, greater than 500 ksi (or 3447 MPa). In some embodiments, the reinforcement fibers are carbon fibers, aramid fibers (e.g. Kevlar), or fiberglass. The reinforcement fibers may be in the form of continuous tows, each tow made up of multiple filaments, unidirectional or multidirectional fibers, tapes of unidirectional fibers, nonwoven or woven fabrics, multiaxial fabrics such as non-crimped fabrics (NCF). Moreover, the reinforcement fibers may be sized or unsized.

The curable matrix resin composition of the composite substrate contains one or more thermoset resins and a curing agent, which may be selected from the epoxy resins and amine curing agents described herein for the curable resin composition of the multifunctional surfacing material. The curable matrix resin composition of the composite substrate may further include a toughening material such as thermoplastic or elastomeric polymer. The toughening material may be in the form of particles, for example, polyamide particles and CSR particles.

For applications in high-performance composite parts such as those in aerospace industry, the content of the reinforcement fibers in the composite substrate, e.g. prepreg ply, may be within the range 40% to 80% by weight, or 55% to 75% by weight.

In the form of continuous surfacing tape, the surfacing material can be laid down onto a composite substrate, e.g. a prepreg layup, by automated placement such as ATL and AFP processes. The surfacing tape may be incorporated into an ATL/AFP process that automatically lays down continuous, resin-impregnated prepreg tapes to form the composite structure. Each prepreg tape is composed of unidirectional reinforcement fibers, e.g. carbon fibers, which are embedded in a curable resin, e.g. epoxy-based resin. In the automated placement process, individual prepreg tapes are laid down directly onto a mandrel or mold surface at high speed, using one or more numerically controlled placement heads to dispense, clamp, cut and restart each tape during placement. The prepreg tapes are dispensed side by side to create a layer of a desired width and length, and then additional layers are built onto a prior layer to provide a prepreg layup with a desired thickness. The surfacing tapes may be incorporated into the automated placement process to form the outermost surfacing layer. Depending on the mold surface configuration, the surfacing tapes may be laid down first onto the mold surface before laying down the prepreg tapes or after the prepreg layup has been laid down. Such ATL/AFP process is conventionally used for the manufacturing of large composite aerospace structures, such as fuselage sections or wing skins of aircrafts. This automated placement process eliminates some of the intermediate processing steps that are typical in the conventional methods of manually applying large surfacing films onto an existing prepreg layup.

EXAMPLES

In the following examples, burn-through testing and lightning strike testing were carried out based on the following procedures.

1. Burn-Through Testing Procedures

Tests were carried out using a propane burner as heat source calibrated using the flame temperature. To simulate a post-crash fire, the heat flux at the panel surface is fixed to 182 kW/m$^2$ with a flame temperature of about 1150-1170° C.

A sheathed thermocouple (type N) was positioned closed to the panel at the "hot face" to monitor the flame temperature during the test. Three thermocouples type K were used to monitor the temperature profile of the "cold face" in direct contact with the panel. An additional thermocouple and a heat flux (HF) detector were also positioned respectively at a distance of 4 inches and at a distance of 12 inches from panel to monitor the temperature and heat flux of the hot gasses above the panel during the test. Two video-cameras were used to detect fire penetration through the panel and to evaluate the panel response during the test.

Figure 3:
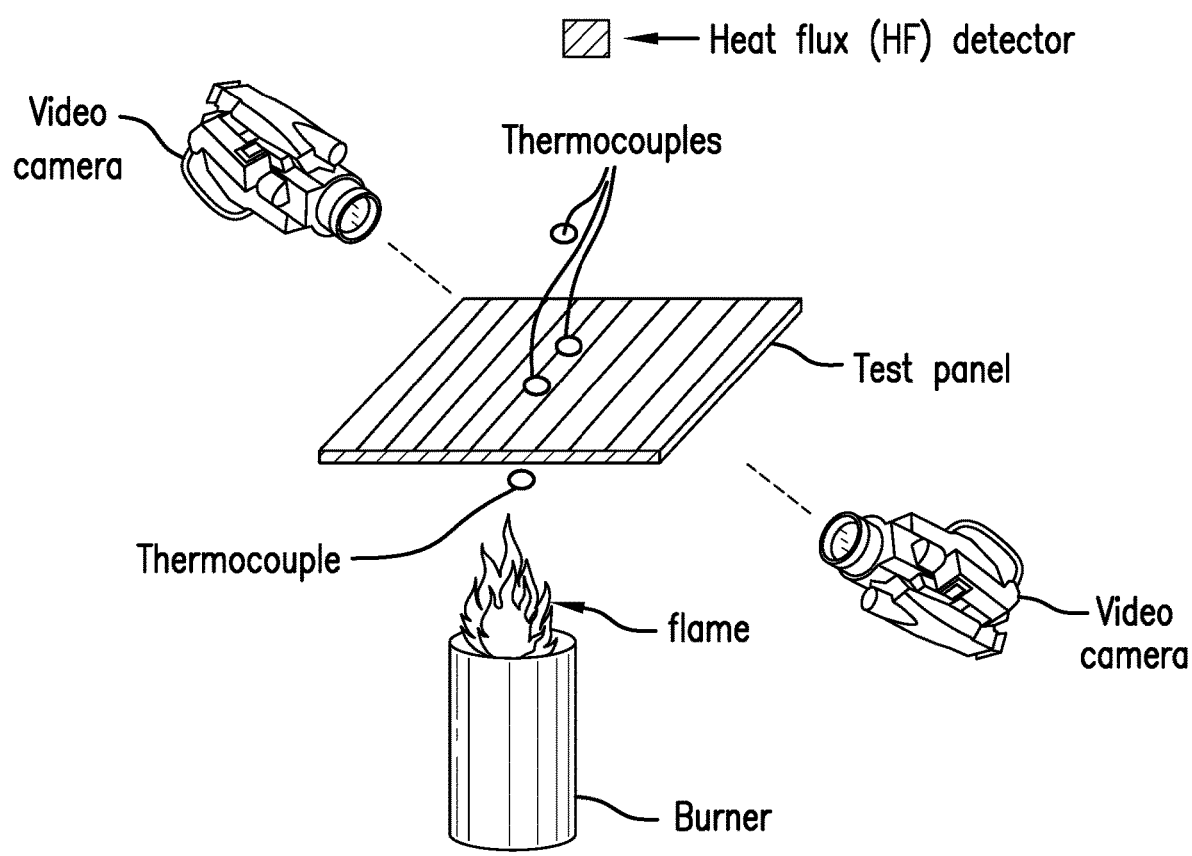
FIG. 3 illustrates a set-up for burn-through test.

Burn-through tests were performed for 5 minutes, while temperatures at "hot face" (fire exposed surface), "cold face" (panel back side) and at a distance of 4 inches from the panel were monitored. A schematization of the test set-up is shown in FIG. 3.

Tested panels were also visually inspected and results were evaluated according to the following damage level criteria:

5=panel severely damaged: cold face of the panel with ≥50% of visible dry fibers 4=panel badly damaged: cold face with 40-50% of visible dry fibers.

3=panel damaged: cold face side with 20-40% of visible dry fibers

2=panel slight damaged: cold face with 10-20% of visible dry fibers

1=panel little damaged: cold face with no or less than 10% of visible dry fibers.

2. Lightning Strike Testing Procedures

To emulate the lightning strike (LS) damage on the aircraft composite structure, painted composite panels were subjected to lightning direct effect tests using Zone 1A (LS test for radome) or Zone 2A (LS test for most of fuselage sections) criteria. Each square test panel (20 inches×20 inches) was placed underneath an electrode, such that the Zone 1A or Zone 2A emulated strike would be at the center of the panel.

The panel was grounded around all four edges by the use of an aluminum picture frame which ensures that the current was extracted as symmetrically as possible. Current was injected into the center of the test panel by the use of a jet diverting electrode and 100 mm long thin copper fuse wire. Two lightning waveforms were used throughout testing; Zone 1A and Zone 2A which are defined in ED-84 as having components A+B+C* and D+B+C* respectively. The individual components are defined below:

Zone 1A Components A+B+C*
  Component A Peak Current=200 kA±10%,
    Action Integral=2.0 MJ/Ω±20%
    Time Duration≤500 μs
  Component B Average current=2.0 kA±20%
    Charge Transfer=10 Coulombs±10%,
    Time Duration≤5 ms
  Component C Average current=200-800 A,
    Charge Transfer=200 Coulombs±20%
    Time Duration=0.25 s to 1 s
  Component C* Average current≥400 A
    Charge Transfer=18 Coulombs±20%
    Time Duration=45 ms±20%

Zone 2A Components D+B+C*
  Component D Peak Current=100 kA±10%,
    Action Integral=0.25 MJ/Ω±20%
    Time Duration≤500 μs
  Component B Average current=2.0 kA±20%
    Charge Transfer=10 Coulombs±10%
    Time Duration≤5 ms
  Component C Average current=200-800 A
    Charge Transfer=200 Coulombs±20%
    Time Duration=0.25 s to 1 s
  Component C* Average current≥400 A
    Charge Transfer=18 Coulombs±20%
    Time Duration=45 ms±20%

Components A, B, and D were generated by capacitor banks which were discharged through series impedance into the test panels. Component C was generated by the partial discharge of a direct current (DC) battery bank with the discharging duration controlled by a cutout fuse.

Example 1

Control Panel without Surfacing Material

A resin composition was prepared according to the formulation shown in Table 1.

TABLE 1

Resin composition used for making structural prepreg plies

| Components | Supplier | Weight % |
|---|---|---|
| Araldite ® PY306CH (Bisphenol-F based epoxy resin) | Huntsman Advanced Materials | 23.1 |
| Araldite ® MY0510CH (triglycidyl ethers of p-aminophenol) | Huntsman Advanced Materials | 23.1 |
| PES 5003P TY2 (polyethersulphone) | Sumitomo | 18.4 |
| Vestamid Z2649 (polyamide 10, 10) | Evonik | 12.0 |
| 4,4' Diaminodiphenylsulfone | Huntsman Advanced Materials | 23.4 |

Vestamid Z2649 is particulate polyamide 10,10 from Evonik, which is insoluble upon curing in the resin composition.

The resin composition was then used to produce unidirectional (UD) prepregs using a hot melt impregnation process. Resin films were produced by coating the resin composition onto a release paper. Next, two of such resin films were laminated onto both sides of a continuous layer of unidirectional carbon fibers (UTS50 E13 12K 800 tex from Toho Tenax, USA), under the aid of heat and pressure, to form a structural prepreg having a fiber areal weight (FAW) equal to 134 gsm and a resin content equal to 35% by weight.

A control cured composite panel (Control Panel 1.0) having a dimension of 13.5 inches×13.5 inches was manufactured for the burn-through test, by laying up 16 structural prepreg plies according with the stacking sequence [+, −, 0, 90]$_{2s}$ followed by curing in an autoclave at 180° C. for 2 hours under 80 psi pressure.

Figure 4:
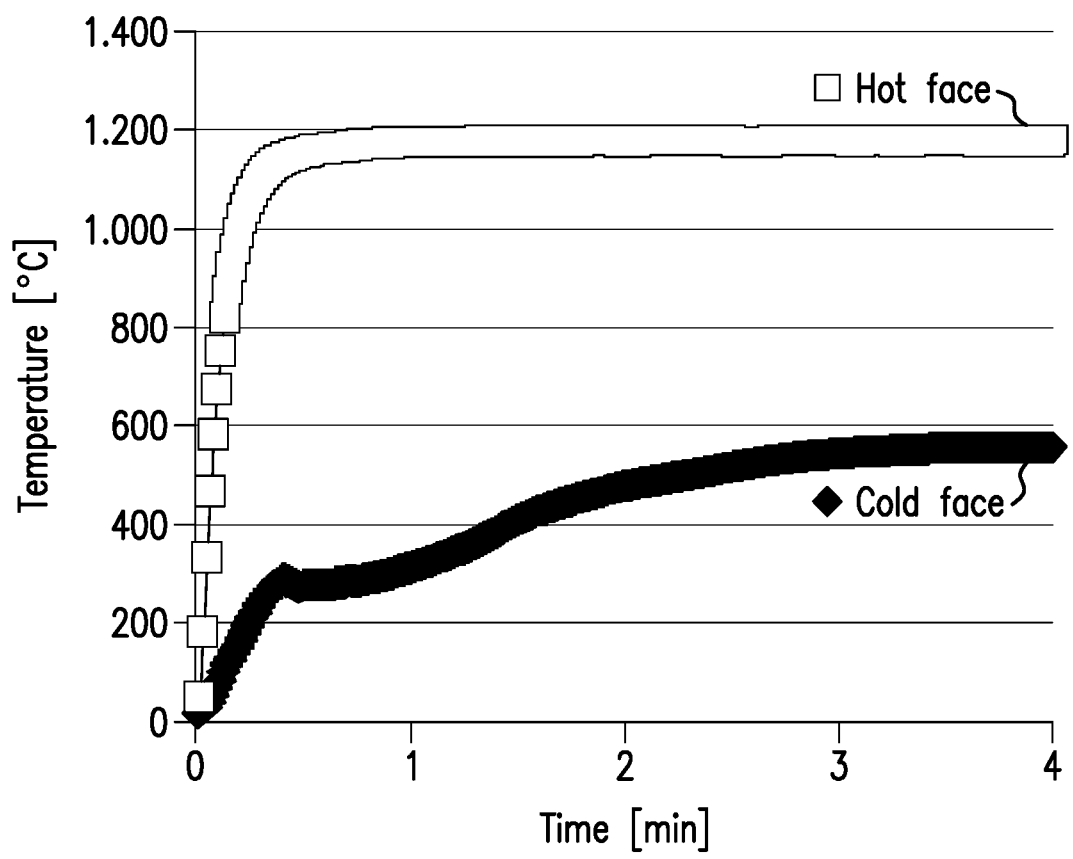
FIG. 4 is a graph of Temperatures vs. Time at the cold face and hot face for an exemplary Control Panel 1.0 without a surfacing material.

FIG. 4 shows the panel temperature as a function of time at the hot face (fire exposed surface) and cold face (surface not exposed to fire). During the test, the temperature on the hot face of the panel was about 1170° C. The temperature of the Control Panel 1.0 increased as a function of the fire exposure time. FIG. 4 shows that the panel temperature rose quickly as a function of time, reaching 400° C. in about 2 min at the cold face of panel. Such high temperature would be catastrophic if this occurred in the inner part of the fuselage because it would cause a failure of structural components (e.g. frames) under low loads and no protection for interior systems and passengers.

Burn-through test results for Control Panel 1.0 are reported in Table 2. $T_{60s}$, $T_{120s}$, $T_{240s}$ are the measured temperature at the panel's cold face after 60 sec, 120 sec and 240 sec, respectively, of fire exposure; $T_{max}$ is the maximum measured temperature at the panel's cold face during the test; $T_{air}$ at 4" and at 12" represent respectively the maximum measured temperatures of the air at a distance of 4 inches and at a distance of 12 inches from the panel; HF at 12" represent the maximum heat flux of the hot gasses above the panel during the test at a distance of 12 inches from the panel's cold face. "Damage" refers to the damage level resulted from the burn-through test according to the description reported in the test procedure above.

TABLE 2

Burn-through test results for Control Panel 1.0

| | $T_{60\,s}$ (° C.) | $T_{120\,s}$ (° C.) | $T_{240\,s}$ (° C.) | $T_{max}$ (° C.) | $T_{air}$ at 4" (° C.) | $T_{air}$ at 12" (° C.) | HF at 12" (KW/m$^2$) | Damage |
|---|---|---|---|---|---|---|---|---|
| Control 1.0 | 310 | 460 | 550 | 560 | 200 | 142 | 8.34 | 5 |

Two square test panels having a dimension of 20 inches×20 inches, were manufactured as described before for Control Panel 1.0 and used for lightning strike (LS) test. Prior to LS test, the panels were painted with an epoxy paint primer (thickness 1 mil) and then a white urethane top coat (thickness 3 mils).

LS test results show that the Control Panel 1.0 with no top protective layer was severely damaged by a zone 1A and zone 2A simulated strikes. Damage was throughout the panel, which would be catastrophic if this occurred during an actual strike.

Example 2

Comparative Panel 2.0 with Silicone Layer

Using a solution coating process, a 0.03 psf (150 gsm) silicone layer was formed on a glass mat (carrier). The silicone coating composition is disclosed in Table 3. Amounts are in weight %.

TABLE 3

Resin composition used for silicone layer

| Components | Weight % |
|---|---|
| Phenylsilsesquioxane-dimethylsiloxane copolymer | 33.4 |
| Polydimethylpolysiloxane, hydroxy-terminated | 11.4 |
| Silsesquioxane polymer | 6.4 |
| Zinc octoate (catalyst) | 0.1 |
| Quartz | 23.7 |
| Acetone (solvent) | 25 |

The silicone layer was dried off to remove volatiles and then placed onto a prepreg layup of 16 prepreg plies, which were laid up according to stacking sequence: [+, −, 0, 90]$_{2s}$. The prepreg plies are as described for Control Panel 1.0 in Example 1. The silicone layer and the prepreg layup were then co-cured at 180° C. for 2 hours under 80 psi pressure in an autoclave to form Comparative Panel 2.0.

Burn-through testing was carried out and the results are reported in Table 4. For comparison, the results of Control Panel 1.0 are also included.

TABLE 4

Burn-through comparative test results for Comparative Panel 2.0 and Control 1.0

| | Surfacing film | $T_{60s}$ (°C.) | $T_{120s}$ (°C.) | $T_{240s}$ (°C.) | $T_{max}$ (°C.) | $T_{air}$ at 4" (°C.) | $T_{air}$ at 12" (°C.) | HRR at 12" (HW/m$^2$) | Damage |
|---|---|---|---|---|---|---|---|---|---|
| Control 1.0 | None | 310 | 460 | 550 | 560 | 200 | 142 | 8.34 | 5 |
| Comparative Panel 2.0 | Silicone layer | 269 | 361 | 468 | 472 | 158 | NM | NM | 4 |

NM = not measured

The results show that the addition of a single silicone-based resin layer provided a limited reduction of the temperatures at the cold face and no sufficient protection of the structural composite substrate.

Example 3

Surfacing Material with Silicone Layer and Titanium Foil

A silicone layer was formed as described in Example 2 and laminated to a titanium foil having a thickness of 35 μm to form a multilayer surfacing material. The multilayer surfacing material was co-cured with a prepreg layup of 16 prepreg plies at 120° C. for 1 hour and at 180° C. for 2 hours under 80 psi pressure in an autoclave, forming Panel 3.0. The prepreg plies were laid up according the stacking sequence: [+, −, 0.90]$_{2s}$ and are the same as those described in Example 1, and the silicone-based film was in contact with the prepreg layup.

Burn-through testing was carried out on the cured panel and the results are reported in Table 5. The results for Control 1.0 and Panel 2.0 are included in this Table for comparison.

TABLE 5

Burn-through comparative test results for Panel 3.0, Panel 2.0 and Control 1.0

| | Surfacing film | $T_{60s}$ (°C.) | $T_{120s}$ (°C.) | $T_{240s}$ (°C.) | $T_{max}$ (°C.) | $T_{air}$ at 4" (°C.) | $T_{air}$ at 12" (°C.) | HRR at 12" (KW/m$^2$) | Damage |
|---|---|---|---|---|---|---|---|---|---|
| Control 1.0 | None | 310 | 460 | 550 | 560 | 200 | 142 | 8.34 | 5 |
| Comparative Panel 2.0 | Silicone | 269 | 361 | 468 | 472 | 158 | NM | NM | 4 |
| Panel 3.0 | Silicone + Titanium foil (35 μm) | 154 | 211 | 267 | 278 | 111 | 86 | 6.12 | 1 |

NM = not measured

The results show that the addition of the titanium foil provides significant reduction of the temperatures at the back side of the composite panel and a reduced panel damage (Damage 1), demonstrating an improvement in burn-through performance. This result is surprising since the addition of a metal foil having a high thermal conductivity was not expected to provide such thermal insulation effect for the composite panel. Thus, it is believed that the solid metal foil and the silicone-based film provide a synergistic effect to improve the burn-through resistance.

LS testing was carried out on Panel 3.0 and Control Panel 1.0, and the results are reported in Table 6. It was observed that the damage resulting from zone 2A simulated strikes onto Panel 3.0 was considerably reduced comparing to the damage occurred on Control Panel 1.0.

TABLE 6

LS comparative test results for Panel 3.0 and Control 1.0

| | Surfacing film | Lighting Strike Test* | Post-struck Damage area (in$^2$) | LS Damage |
|---|---|---|---|---|
| Control 1.0 | None | 2A | ~6 inch diameter surface damage. Panel punched a hole. | Severe damage, panel punched through. Failed LS test |
| Panel 3.0 | Silicone + Titanium foil (35 μm) | 2A | ~5 inch diameter surface damage. Maximum 1 ply in depth. Panel backside no damage | Surface damage only - Pass the test |

*Zone 2A LS test - Current Components D, B, and C* were applied.

The results of Table 6 show that the addition of the silicone and titanium foil in Panel 3.0 provided better lightning strike protection as compared to the Control Panel 1.0.

Example 4

Surfacing Material with Fire-Retardant Resin, Silicone Layer and Copper Foil

A fire-retardant resin layer (labeled as "FST layer") with an areal weight of 0.03 psf (150 gsm) was formed from the resin formula disclosed in Table 7. Amounts are in weight %.

TABLE 7

FST layer resin composition

| Components | Weight % |
|---|---|
| Diglycidylether of Bisphenol A | 22 |
| Tetraglycidylether methylenedianiline | 4 |
| Diglycidylether of Tetrabromo Bisphenol A | 10 |

TABLE 7-continued

FST layer resin composition

| Components | Weight % |
|---|---|
| Acrylonitrile butadiene polymer (NIPOL 1472) | 2 |
| CTB elastomer | 2 |
| Triethyl phosphate (TEP) | 6 |
| Zinc Borate (Firebrake ZB) | 10 |
| Alumina Trihydrate (ATH) | 4 |
| Melamine Cyanurate | 12 |
| Red Phosphor (RP 607) | 8 |
| Silica-Alumina ceramic microspheres (G-200 Zeeospheres) | 13 |
| DICY | 1.5 |
| 4,4'-DDS | 2 |
| Urea CA 152 | 1.5 |
| Fumed Silica (CaboSil TS-720) | 2 |
| Total | 100 |
| FST components (wt %, Total) | 40% |

A 0.03 psf (150 gsm) silicone layer was formed as described in Example 2. The FST layer, the silicone layer and a copper foil (35 μm thickness) were laminated together with the copper foil sandwiched between the silicone layer and the FST layer, forming a tri-layer surfacing material. A second tri-layer surfacing material was made in the same manner with a copper foil (35 μm thickness) sandwiched between two FST layers (0.03 psf or 150 gsm each layer). A third tri-layer surfacing material was made with an aluminum foil (25 μm thickness) sandwiched between a silicone layer (0.03 psf or 150 gsm) and a FST layer (0.03 psf or 150 gsm).

Each multilayer surfacing material was co-cured with a prepreg layup of 16 prepreg plies with the same layup configuration and under the same curing conditions as described in Example 3, forming Panels 4.0, 5.0 and 6.0.

Burn-through testing was carried out for all cured panels. Burn-through test results are reported in Table 8. The results for Control 1.0 are included in Table 8 for comparison.

TABLE 8

Burn-through comparative test results for Panels 4.0-6.0 and Control 1.0

| | Surfacing film | $T_{60\,s}$ (° C.) | $T_{120\,s}$ (° C.) | $T_{240\,s}$ (° C.) | $T_{max}$ (° C.) | $T_{air}$ at 4" (° C.) | $T_{air}$ at 12" (° C.) | HRR at 12" (KW/m$^2$) | Damage |
|---|---|---|---|---|---|---|---|---|---|
| Control 1.0 | None | 310 | 460 | 550 | 560 | 200 | 142 | 8.34 | 5 |
| Panel 4.0 | Silicone + Copper (35 μm) + FST film | 224 | 275 | 338 | 371 | 124 | 105 | 6.35 | 2 |
| Panel 5.0 | FST film + Copper (35 μm) + FST film | 185 | 218 | 314 | 363 | 116 | 107 | 6.93 | 2 |
| Panel 6.0 | Silicone + Aluminum (25 μm) + FST film | 234 | 290 | 398 | 430 | 136 | 122 | 7.17 | 3 |

The multilayered surfacing film comprising the aluminum foil (Panel 6.0) provided a limited burn-through resistance as compared to the Control Panel 1.0. The result is believed to be due to the low aluminum melting point (lower than 900° C.).

The multilayered surfacing film comprising the copper foil (Panels 4.0 and 5.0) provided an adequate burn-through resistance comparing to the Control Panel 1.0. The result is believed to be due to the high copper melting point (greater than 900° C.). The top layer on the composite panel provided a reduction in the temperature at the back side at a distance of 4 inches from the panel (during a burn-through test performed at 182 KW/m$^2$ for 5 minutes) of about 75° C.–85° C., as compared to a similar panel without said top layer and a reduction of the temperature at the back side at a distance of 12 inches from the panel (during a burn-through test performed at 182 KW/m$^2$ for 5 minutes) of about 35° C.–40° C. (see Table 8).

LS testing was carried out on Panels 4.0 and 5.0 and Control Panel 1.0, and the results are reported in Table 9.

TABLE 9

LS comparative test results for Panels 4.0, 5.0 and Control 1.0

| | Surfacing film | Lighting Strike Test* | Post-struck Damage area (inch$^2$) | LS Damage |
|---|---|---|---|---|
| Control 1.0 | None | 2A | ~6 inch diameter surface damage. Panel punched a hole. | Severe damage, panel punched through. Failed LS test |

TABLE 9-continued

LS comparative test results for Panels 4.0, 5.0 and Control 1.0

| | Surfacing film | Lighting Strike Test* | Post-struck Damage area (inch²) | LS Damage |
|---|---|---|---|---|
| Panel 4.0 | Silicone + Copper (35 µm) + FST film | 2A | ~1 inch diameter front surface damage. 1 ply in depth maximum. | Surface small area damage only. Very good LS protection. Pass LS test |
| Panel 5.0 | FST film + Copper (35 µm) + FST film | 2A | ~1 inch diameter front surface damage. 1 ply in depth maximum. | Surface small area damage only. Very good LS protection. Pass LS test |
| Control 1.0 | None | 1A | ~11 inch diameter surface damage. Panel punched a hole. | Severe damage, panel punched through. Failed LS test |
| Panel 4.0 | Silicone + Copper (35 µm) + FST film | 1A | ~2.5 inch diameter front surface damage. 4 to 5 ply in depth. | Small area damage. Good LS protection. Pass LS test |
| Panel 5.0 | FST film + Copper (35 µm) + FST film | 1A | ~2 inch diameter front surface damage. 3 to 4 ply in depth. | Small area damage. Good LS protection. Pass LS test |

*Zone 1A LS test - Current Components A, B, and C* were applied.
*Zone 2A LS test - Current Components D, B, and C* were applied.

It was observed that the lighting strike damage resulting from zone 1A and zone 2A simulated strikes for Panels 4.0 and 5.0 was minimal and considerably reduced as compared to the damage occurred on Control Panel 1.0.

The results show that, beside from improved burn-through resistance, the addition of the surfacing material with the copper foil in the composite panel (Panels 4.0 and 5.0) also provided adequate lightning strike protection.

Terms, Definitions, and Abbreviations

In the present disclosure, the modifier "approximately" and "about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(s)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc. . . .

What is claimed is:

1. A multifunctional surfacing material capable of providing lightning strike protection (LSP) and burn-through resistance, comprising a conductive layer positioned between a first resin layer and a second resin layer,
   wherein at least one of the first and second resin layers comprises:
   (a) a blend of multifunctional epoxy resins;
   (b) a curing agent;
   (c) a polymeric toughening component;
   (d) ceramic microspheres; and
   (e) a fire-retardant component comprising a phosphorous-modified epoxy resin or phosphorous-modified phenolic resin;
   wherein the first and second resin layers do not contain any reinforcement fibers.

2. The multifunctional surfacing material of claim 1, wherein the fire-retardant component further comprises one or more organic phosphorous-containing compounds selected from: trimethyl phosphate, triethyl phosphate, tributyl phosphate, trioctyl phosphate, tributoxyethyl phosphate, tricresyl phosphate, cresyldiphenyl phosphate, octyldiphenyl phosphate, polyphosphonate, and polyphosphate.

3. The multifunctional surfacing material of claim 1, wherein the fire-retardant component further comprises one or more inorganic phosphorous-containing compounds selected from: red phosphorous, melamine phosphate, melamine polyphosphate, ammonium polyphosphate, dimelamine phosphate, pyrophosphate, and inorganic phosphinates.

4. The multifunctional surfacing material of claim 1, wherein the fire-retardant component further comprises one or more boron-containing compounds selected from: zinc borate, barium metaborate, and calcium metaborate.

5. The multifunctional surfacing material of claim 1, wherein the phosphorous-modified epoxy resin or phosphorous-modified phenolic resin is a reaction product obtained by reacting a multifunctional epoxy or phenolic resin with an organic phosphinic acid or anhydride thereof.

6. The multifunctional surfacing material of claim 1, further comprising a smoke-suppressant selected from metal hydroxides.

7. The multifunctional surfacing material of claim 6, wherein the smoke-suppressant is alumina trihydrate (ATH).

8. The multifunctional surfacing material of claim 1, further comprising an inorganic filler in particulate form.

9. The multifunctional surfacing material of claim 8, wherein the inorganic filler is silica.

10. The multifunctional surfacing material of claim 1, wherein the polymeric toughening component (c) comprises a toughening material selected from:
   (i) an elastomeric or thermoplastic polymer;
   (ii) a pre-react adduct formed by the reaction of an epoxy resin, a bisphenol, and an elastomer;
   (iii) a copolymer of polyether sulfone (PES) and polyetherether sulfone (PEES);
   (iv) core-shell rubber (CSR) particles;
   and combinations thereof.

11. The multifunctional surfacing material of claim 1, wherein the blend of multifunctional epoxy resins comprises a difunctional epoxy resin and a trifunctional or tetrafunctional epoxy resin.

12. The multifunctional surfacing material of claim 1, wherein the second resin layer is substantially the same in composition as the first resin layer.

13. The multifunctional surfacing material of claim 1, wherein the conductive layer is a porous or nonporous metallic layer.

14. The multifunctional surfacing material of claim 1, wherein the conductive layer is a nonporous metal foil having a thickness of less than about 76 µm.

15. The multifunctional surfacing material of claim 1, wherein the conductive layer is a porous layer with an areal weight within the range of about 60 gsm to about 350 gsm.

16. The multifunctional surfacing material according to claim 15, wherein the conductive layer is a metal screen or an expanded metal foil.

17. The multifunctional surfacing material of claim 1, wherein the surfacing material is in the form of a continuous or elongated tape having a width in the range of about 0.125 in to about 12 in.

18. A composite structure comprising:
a composite substrate comprising reinforcement fibers impregnated or infused with a curable matrix resin;
the multifunctional conductive surfacing material of claim 1 laminated to a surface of the composite substrate.

19. The composite structure of claim 18, wherein the composite substrate is a prepreg layup, which comprises a plurality of prepreg plies arranged in a stacking arrangement, each prepreg ply comprising reinforcing fibers impregnated with or embedded in a curable matrix resin.

20. A method for forming a composite structure comprising:
applying the multifunctional surfacing material of claim 1 to a surface of a composite substrate, which comprises reinforcement fibers impregnated with or embedded in a curable matrix resin; and
co-curing the surfacing material together with the composite substrate.

\* \* \* \* \*